(12) United States Patent
Bessemer et al.

(10) Patent No.: US 12,663,394 B2
(45) Date of Patent: Jun. 23, 2026

(54) SYSTEMS AND PROCESSES FOR DETERMINING DRYING TIMES FOR GRANULATE MATERIALS BASED ON INITIAL MOISTURE CONTENT OF THE MATERIALS

(71) Applicant: Novatec, Inc., Baltimore, MD (US)

(72) Inventors: Conrad Bessemer, Millersville, MD (US); Gregory Michael Washburn, Bridgeville, MD (US); Frederick W. Eichhorn, II, Finksburg, MD (US); Diego Ruben Barrettino, Lugano (CH); Ryan Ismirlian, Glen Burnie, MD (US); Kevin Shipley, Perry Hall, MD (US); Perry Jordan, Catonsville, MD (US); Mark Haynie, Pasadena, MD (US); Sean P. Healy, Aiken, SC (US)

(73) Assignee: Novatec, Inc., Baltimore, MD (US)

( * ) Notice: Subject to any disclaimer, the term of this patent is extended or adjusted under 35 U.S.C. 154(b) by 147 days.

(21) Appl. No.: 18/434,400

(22) Filed: Feb. 6, 2024

(65) Prior Publication Data

US 2024/0345015 A1      Oct. 17, 2024

Related U.S. Application Data

(60) Provisional application No. 63/492,433, filed on Mar. 27, 2023, provisional application No. 63/483,320, filed on Feb. 6, 2023.

(51) Int. Cl.
*G01N 27/22*      (2006.01)
*F26B 25/22*      (2006.01)
(52) U.S. Cl.
CPC ........... *G01N 27/223* (2013.01); *F26B 25/22* (2013.01)

(58) Field of Classification Search
CPC ........ G01N 27/00; G01N 27/02; G01N 27/22; G01N 27/223; B29B 9/00; B29B 13/00;
(Continued)

(56) References Cited

U.S. PATENT DOCUMENTS 6,163,976 A      12/2000   Tada et al.
7,662,211 B2     2/2010    Federico
(Continued)

FOREIGN PATENT DOCUMENTS

CN           204044097 U   * 12/2014   ............. G01N 27/04
CN           105115291 A   * 12/2015   ............. F26B 25/22
(Continued)

OTHER PUBLICATIONS

International Search Report and Written Opinion of the International Searching Authority for PCT Application No. PCT/US2023/074288, dated Jan. 8, 2024.
(Continued)

*Primary Examiner* — Hoai-An D. Nguyen
(74) *Attorney, Agent, or Firm* — Fox Rothschild LLP

(57)      ABSTRACT

A moisture sensing system is configured to determine the moisture level in granulate materials, such as, but not limited to, plastic resin pellets and agricultural grains. The system is configured to measure various parameters relating to the environment around the granulate material, and to determine additional characteristics of the granulate material based on these parameters. In some embodiments, the system is configured as a multi-sensor array with the computational and communicative capabilities to process the acquired measurements and provide outputs to a process device, such as a dryer, to help optimize the drying or other processes performed on the granulate material after the moisture measurements and other data are acquired.

13 Claims, 13 Drawing Sheets

(58) Field of Classification Search
CPC .......... B29B 13/02; B29B 13/06; B29B 9/16;
B29B 13/065; B29B 2009/168; F26B
3/00; F26B 3/02; F26B 5/00; F26B
21/00; F26B 21/06; F26B 21/08; F26B
21/10; F26B 25/00; F26B 25/0001; F26B
25/0002; F26B 3/06; F26B 5/04; F26B
21/12; F26B 25/22
USPC ......................... 324/600, 649, 658, 686, 689
See application file for complete search history.

(56) References Cited

U.S. PATENT DOCUMENTS

| | | | |
|---|---|---|---|
| 8,021,462 B2 | 9/2011 | Moretto | |
| 8,412,383 B2 | 4/2013 | Moretto | |
| 8,793,900 B2 | 8/2014 | Moretto | |
| 9,534,840 B2 | 1/2017 | Pahwa | |
| 2005/0091872 A1 | 5/2005 | Gracff | |
| 2006/0123657 A1 | 6/2006 | Tada et al. | |
| 2006/0168843 A1 | 8/2006 | Zlotos | |
| 2007/0048373 A1 | 3/2007 | Chastain et al. | |
| 2008/0314461 A1 | 12/2008 | Moretto | |
| 2010/0229420 A1* | 9/2010 | Garrido ................... | F26B 25/22 |
| | | | 34/493 |
| 2014/0345153 A1 | 11/2014 | Pahwa et al. | |
| 2018/0264684 A1 | 9/2018 | Maguire et al. | |
| 2019/0030774 A1 | 1/2019 | Moretto | |
| 2020/0158654 A1 | 5/2020 | Pore et al. | |
| 2020/0254652 A1 | 8/2020 | Bessemer et al. | |
| 2021/0387380 A1 | 12/2021 | Bock | |
| 2022/0024076 A1 | 1/2022 | Piva | |
| 2024/0263874 A1 | 8/2024 | Bessemer | |

FOREIGN PATENT DOCUMENTS

| | | | | | |
|---|---|---|---|---|---|
| CN | 113175981 A | * | 7/2021 | .............. | G01G 19/00 |
| ES | 2632103 T3 | * | 9/2017 | .............. | F26B 25/22 |
| IT | 201900018854 A1 | | 4/2021 | | |
| JP | H0814754 A | * | 1/1996 | .............. | F26B 25/00 |
| JP | 2010002107 A | * | 1/2010 | .............. | F26B 17/14 |
| UA | 128713 C2 | * | 10/2024 | .............. | A01D 91/04 |

OTHER PUBLICATIONS

International Search Report and Written Opinion of the International Searching Authority for PCT Application No. PCT/US2024/014630, dated Jun. 12, 2024.
De Leersnyder et al., "Breakage and drying behaviour of granules in a continuous fluid bed dryer: Influence of process parameters and wet granule transfer"; European Journal of Pharmaceutical Sciences; vol. 115, Mar. 30, 2018, pp. 223-232; Available online Mar. 6, 2018.

* cited by examiner

First Module 202

Material Flow Path

AMBIENT HUMIDITY/
TEMP SENSOR
AIR PATHWAY

ISOMETRIC VIEW
SCALE 1:1

VACUUM MATERIAL PULL, CREATES VOID BELOW LANCE

GRAVITY FEED INTO CREATED VOID

GRAVITY FEED (INSERTION INTO MATERIAL HAS OPPOSITE FLOW)

SECTION A-A: SENSOR MATERIAL PATHWAY

10

System 500

First Module 202

First Moisture Sensor 212 /
Electrically-Conductive Elements  222

Force Sensor
214 / Force
Transducers
224

Second Moisture
Sensor 216

Gyroscope 218

Intergranular
Temperature and
Humidity Sensor 211

Second Module 204

Computing Device
206

Temperature Sensor
232

Humidity Sensor
234

Transmitter 236

User Interface 238

Computing device 504, e.g.,
smartphone

FIG. 14

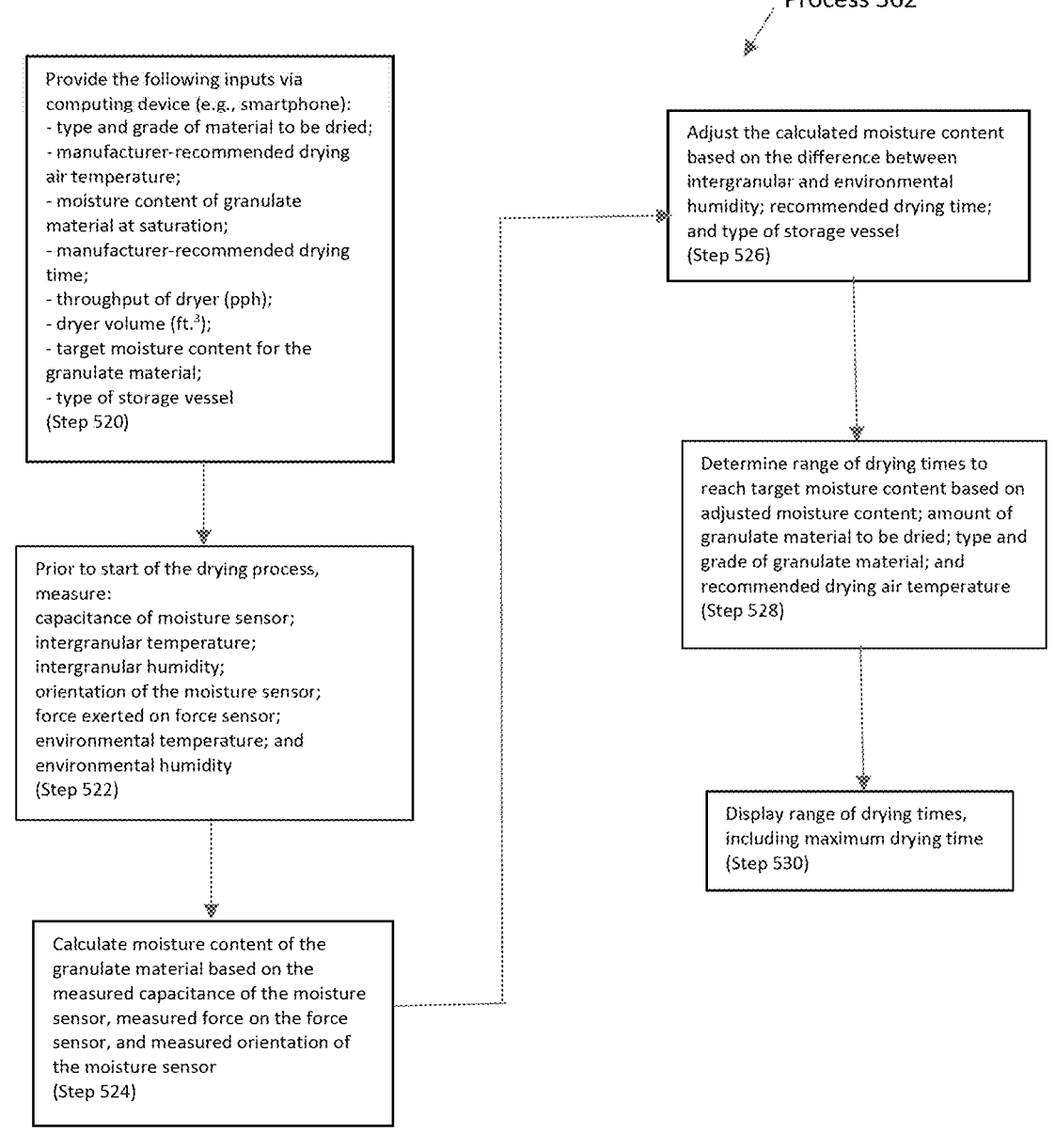

Process 502

Provide the following inputs via
computing device (e.g., smartphone):
- type and grade of material to be dried;
- manufacturer-recommended drying
air temperature;
- moisture content of granulate
material at saturation;
- manufacturer-recommended drying
time;
- throughput of dryer (pph);
- dryer volume (ft.³);
- target moisture content for the
granulate material;
- type of storage vessel
(Step 520)

Prior to start of the drying process,
measure:
capacitance of moisture sensor;
intergranular temperature;
intergranular humidity;
orientation of the moisture sensor;
force exerted on force sensor;
environmental temperature; and
environmental humidity
(Step 522)

Calculate moisture content of the
granulate material based on the
measured capacitance of the moisture
sensor, measured force on the force
sensor, and measured orientation of
the moisture sensor
(Step 524)

Adjust the calculated moisture content
based on the difference between
intergranular and environmental
humidity; recommended drying time;
and type of storage vessel
(Step 526)

Determine range of drying times to
reach target moisture content based on
adjusted moisture content; amount of
granulate material to be dried; type and
grade of granulate material; and
recommended drying air temperature
(Step 528)

Display range of drying times,
including maximum drying time
(Step 530)

SYSTEMS AND PROCESSES FOR DETERMINING DRYING TIMES FOR GRANULATE MATERIALS BASED ON INITIAL MOISTURE CONTENT OF THE MATERIALS

BACKGROUND

A moisture sensor is a measurement device that determines the moisture content or moisture level in materials, including granulate materials, or granulates. Moisture content and moisture level refer to the percentage of water and other liquids in a material. Some granulates, such as plastic resin granulates, may be used in continuous manufacturing processes that produce plastic products. Standards or limits for the moisture levels in specific types of granulate materials at the start of a manufacturing process commonly are established by private companies, governments, trade agencies, professional organizations, etc.

Control of the moisture content of a material can significantly influence the physical properties of the material throughout all stages of processing, and the quality of finished products made from the material. Thus, the moisture content in solid materials used in vertical industries such as plastics and polymers, pharmaceuticals, food, agriculture, and construction typically is measured and documented. However, the fundamental ways in which moisture content is measured have not changed, and typically require operator intervention due to the need for frequent calibration of the moisture sensor. Consequently, measuring moisture content on-line, and using the measurements to adjust production processes in real-time, in general, are not feasible in most process industries. For example, devices for monitoring of the moisture content in granulates are described in publication no. WO2012004621A1, but these devices require frequent calibration.

SUMMARY

In one aspect of the disclosed technology, a system for determining a drying time for a granulate material includes a moisture sensor configured to generate an output relating to a moisture content of the granulate material; and a computing device communicatively coupled to the moisture sensor. The computing device is configured to calculate the moisture content of the granulate material prior to a drying process based at least in part on the output of the moisture sensor, and to determine a drying time for the drying process based at least in part on a difference between the calculated moisture content of the granulate material and a targeted moisture content for the granulate material.

In another aspect of the disclosed technology, the system further includes a force sensor communicatively coupled to the computing device and configured to immersed in the granulate material. The computing device is further configured to calculate the moisture content of the granulate material prior to the drying process based at least in part on an output of the force sensor.

In another aspect of the disclosed technology, the system further includes a gyroscope communicatively coupled to the computing device and configured to measure an orientation of the moisture sensor, wherein the computing device is further configured to calculate the moisture content of the granulate material prior to the drying process based at least in part on the orientation of the moisture sensor.

In another aspect of the disclosed technology, the computing device is further configured to display the drying time.

In another aspect of the disclosed technology, the system further includes a first humidity sensor communicatively coupled to the computing device and configured to measure an intergranular humidity of the granulate material; and a second humidity sensor communicatively coupled to the computing device and configured to measure the humidity of the environment around the granulate material. The computing device is further configured to adjust the calculated moisture content of the granulate material based at least in part on a difference between the intergranular humidity and the environmental humidity. The computing device is further configured to determine the drying time based at least in part on the difference between the adjusted moisture content of the granulate material and the targeted moisture content for the granulate material.

In another aspect of the disclosed technology, the computing device is further configured to adjust the calculated moisture content of the granulate material based at least in part on the recommended drying time.

In another aspect of the disclosed technology, the computing device is further configured to adjust the calculated moisture content of the granulate material based at least in part on the type of storage vessel from which the granulate material will be drawn.

In another aspect of the disclosed technology, the computing device is a smartphone.

In another aspect of the disclosed technology, a process for determining a drying time for a granulate material includes inputting at least some of the following information into a computing device: the type and grade of the granulate material; a recommended drying air temperature; a moisture content at which the granulate material becomes saturated; a recommended drying time; the throughput of a dryer in which the granulate material will be dried; the volume of the dryer; a target moisture content for the granulate material; and the type of storage vessel from which the granulated material will be drawn.

The process also includes calculating a moisture content in the granulate material before the start of the drying process; and determining a drying time based at least in part on a difference between the calculated moisture content of the granulate material before the start of the drying process and the target moisture content for the granulate material.

In another aspect of the disclosed technology, the process further includes measuring a force exerted on a force sensor immersed in the granulate material. Calculating a moisture content in the granulate material before the start of the drying process includes calculating the moisture content in the granulate material before the start of the drying process based at least in part on the measured force.

In another aspect of the disclosed technology, the process further includes measuring a capacitance of a moisture sensor immersed in the granulate material. Calculating a moisture content in the granulate material before the start of the drying process includes calculating the moisture content in the granulate material before the start of the drying process based at least in part on the measured capacitance of the moisture sensor.

In another aspect of the disclosed technology, the process further includes measuring an orientation of the moisture sensor. Calculating a moisture content in the granulate material before the start of the drying process includes calculating the moisture content in the granulate material before the start of the drying process based at least in part on the measured orientation of the moisture sensor.

In another aspect of the disclosed technology, the process further includes measuring an intergranular humidity of the granulate material; measuring the environmental humidity around the granulate material; determining a difference between the intergranular humidity of the granulate material and the environmental humidity around the granulate material; and adjusting the calculated moisture content in the granulate material based at least in part on the difference between the intergranular humidity of the granulate material and the environmental humidity around the granulate material. The process further includes determining a drying time based at least in part on a difference between the calculated moisture content of the granulate material before the start of the drying process and the target moisture content for the granulate material includes determining the drying time based at least in part on a difference between the adjusted moisture content of the granulate material before the start of the drying process and the target moisture content for the granulate material.

DESCRIPTION OF THE DRAWINGS

The following drawings are illustrative of particular embodiments of the present disclosure and do not limit the scope of the present disclosure. The drawings are not to scale and are intended for use in conjunction with the explanations provided herein. Embodiments of the present disclosure will hereinafter be described in conjunction with the appended drawings.

FIG. 14 is a diagrammatic view of a process for determining a range of drying times needed to dry a granulate material.

DETAILED DESCRIPTION

Figure 1:
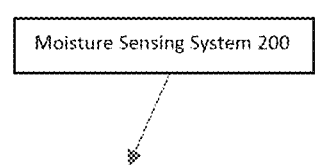
FIG. 1 is a diagrammatic illustration of a moisture sensing system.
Figure 1:
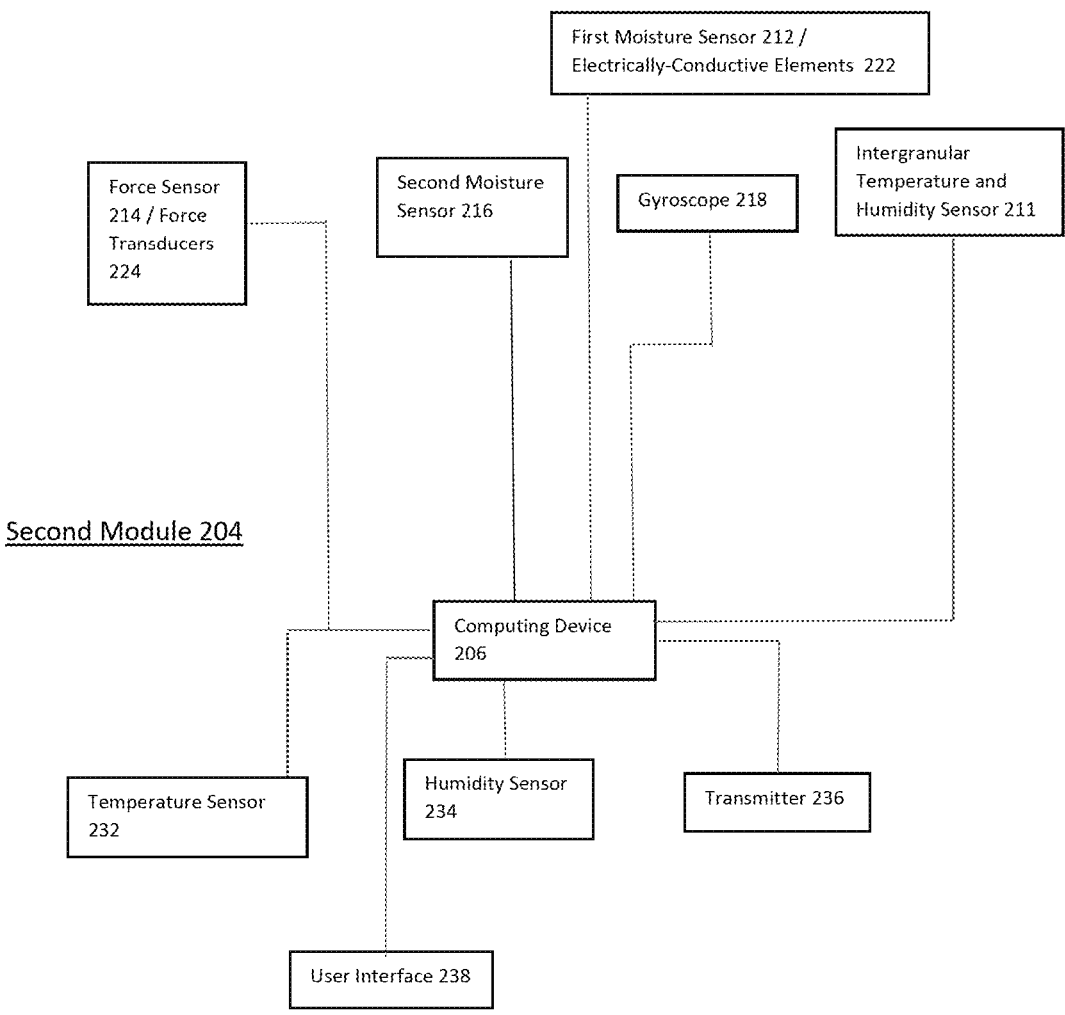

The inventive concepts are described with reference to the attached figures, wherein like reference numerals represent like parts and assemblies throughout the several views. The figures are not drawn to scale and are provided merely to illustrate the instant inventive concepts. The figures do not limit the scope of the present disclosure or the appended claims. Several aspects of the inventive concepts are described below with reference to example applications for illustration. It should be understood that numerous specific details, relationships, and methods are set forth to provide a full understanding of the inventive concepts. One having ordinary skill in the relevant art, however, will readily recognize that the inventive concepts can be practiced without one or more of the specific details or with other methods. In other instances, well-known structures or operation are not shown in detail to avoid obscuring the inventive concepts.

Moisture Sensing System 200

FIG. 1 depicts a moisture sensing system 200. The system 200 is configured to determine the moisture level in granulates, i.e., granulate materials, such as, but not limited to, plastic resin pellets and agricultural grains. In addition, the system 200 is configured to measure various parameters relating to the environment around the granulate material, and to determine additional characteristics of the granulate material as discussed below. The system 200 is a multi-sensor array with the computational and communicative capabilities to process the acquired measurements and provide outputs to a process device, such as a dryer, to help optimize the drying or other processes performed on the granulate material after the moisture measurements and other data are acquired.

The system 200 comprises a first module 202, a second module 204, and a computing device 600. The first module 202 is configured to be immersed in the granulate material. The second module 204 is configured to operate outside of the granulate material. The computing device 600 is housed within the second module 204. In alternative embodiments, the computing device 600 can be housed within the first module 202. In other alternative embodiments, the computing device 600 can be a standalone device located near, or remotely from the first and second modules 202, 204. In other alternative embodiments, the signal processing and computational functions of the computing device 600 can be divided among components housed in the first and second modules 202, 204, i.e., portions of the computing device 600 can be housed within the first and second modules 202, 204.

The system 200 can determine the moisture content and other parameters of the granulate material at, or upstream of the process device. For example, the system 200 can measure the moisture content of resin granulates while the resin granulates are being held in a storage vessel such as a Gaylord bin. In another possible application, the system 200 can measure the moisture content of agricultural grains while the grains are being held in a grain silo. In other possible applications, the system 200 can measure the moisture content of the resin pellets or the agricultural grains while the resin pellets or the agricultural grains are located in a transport device, such as a railcar, or while the resin pellets or the agricultural grains are being conveyed from the transport device and to the storage bin or the grain silo. In other possible applications, the system 200 can measure the moisture content of the resin pellets or the agricultural grains at a processing device, such as a dryer, or while the resin pellets or the agricultural grains are being conveyed from the storage bin or the grain silo and to the processing device. The above examples are presented for illustrative purposes only. The system 200 can be used in other locations, in other applications, and with other types of granulate materials.

Figure 2:
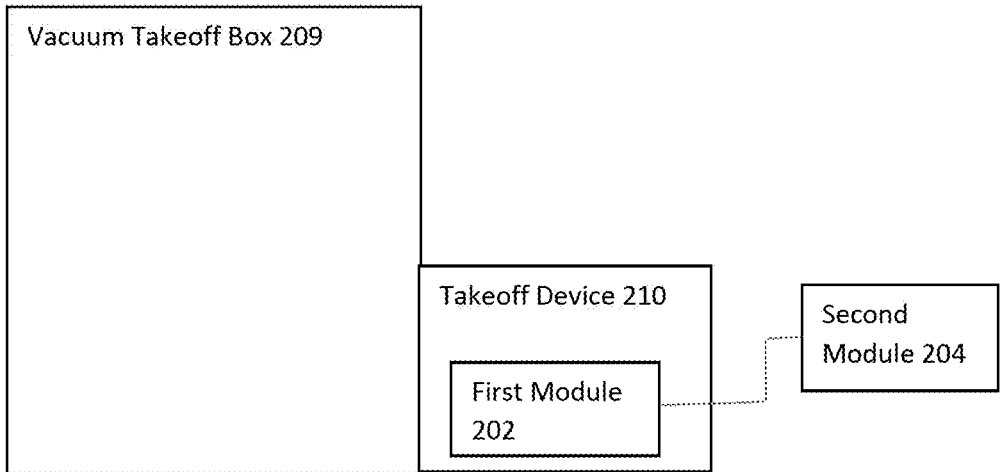
FIG. 2 is a side view of the system shown in FIG. 1, installed on a vacuum takeoff box of a surge bin.

The various components of the system 200 can be mounted at fixed locations. For example, as depicted in FIG. 2, the first module 202 can be located at a vacuum takeoff box 209 of a surge bin. The first module 202 can be installed in a takeoff device 210. The takeoff device 210 is mounted on the vacuum takeoff box 209, and is configured to allow an operator to selectively draw a sample of the granulate material from the vacuum takeoff box 209 so that the first module 202 can be immersed in the granulate material. Because the takeoff device 210 is located outside of the flow of the granulate material, the use of the takeoff device 210 allows a sample having a proper fill volume to be drawn regardless of whether the granulate material is being conveyed under vacuum, under pressure, or by gravity.

The second module 204 can be mounted on an exterior of the takeoff device 210, so that the second module 204 is located outside of, and is not exposed to the granulate material.

In other applications, the system 200 can have a hand-held or otherwise mobile configuration. For example, FIGS. 6-13 depict an embodiment of the system 200 mounted on a hand-held vacuum probe for drawing resin granulates from a Gaylord bin or other storage device.

The first module 202 is depicted diagrammatically in FIG. 1. As noted above, the first module 202 is configured to be immersed in the granulate material, or granulates, whose moisture content is to be determined. The first module 202 is configured to measure the moisture content of the granulate material, the intergranular temperature and humidity levels within the supply of granulate material, and the extent to which the granulate material may be compressed. The terms "moisture content" and "moisture level" are used interchangeably herein, and refer to the percentage of water and other liquids in a material.

The second module 204 can incorporate both sensing and communication functions. In particular, the second module 204 is configured to measure the temperature and humidity of the environment around the granulate material. In addition, the second module 204 is configured to transmit the adjusted moisture content of the granulate material, and other information, to a process device, such as a dryer, to which the granulate material is to be conveyed.

Referring to FIG. 1, the first module 202 includes a housing (not shown). The first module 202 also includes an intergranular temperature and humidity sensor 211; a first moisture sensor 212; one or more force sensors 214; a second moisture sensor 216; and a three-axis gyroscope 218 each mounted on, or within the housing. The intergranular temperature and humidity sensor 211, the primary and secondary moisture sensors 212, 214, the force sensor 214, and the gyroscope 218 are communicatively coupled to the computing device 600 via a wiring harness (not shown). These components can be communicatively coupled to the computing device 600 via a suitable wireless means, in alternative embodiments.

Figure 3:
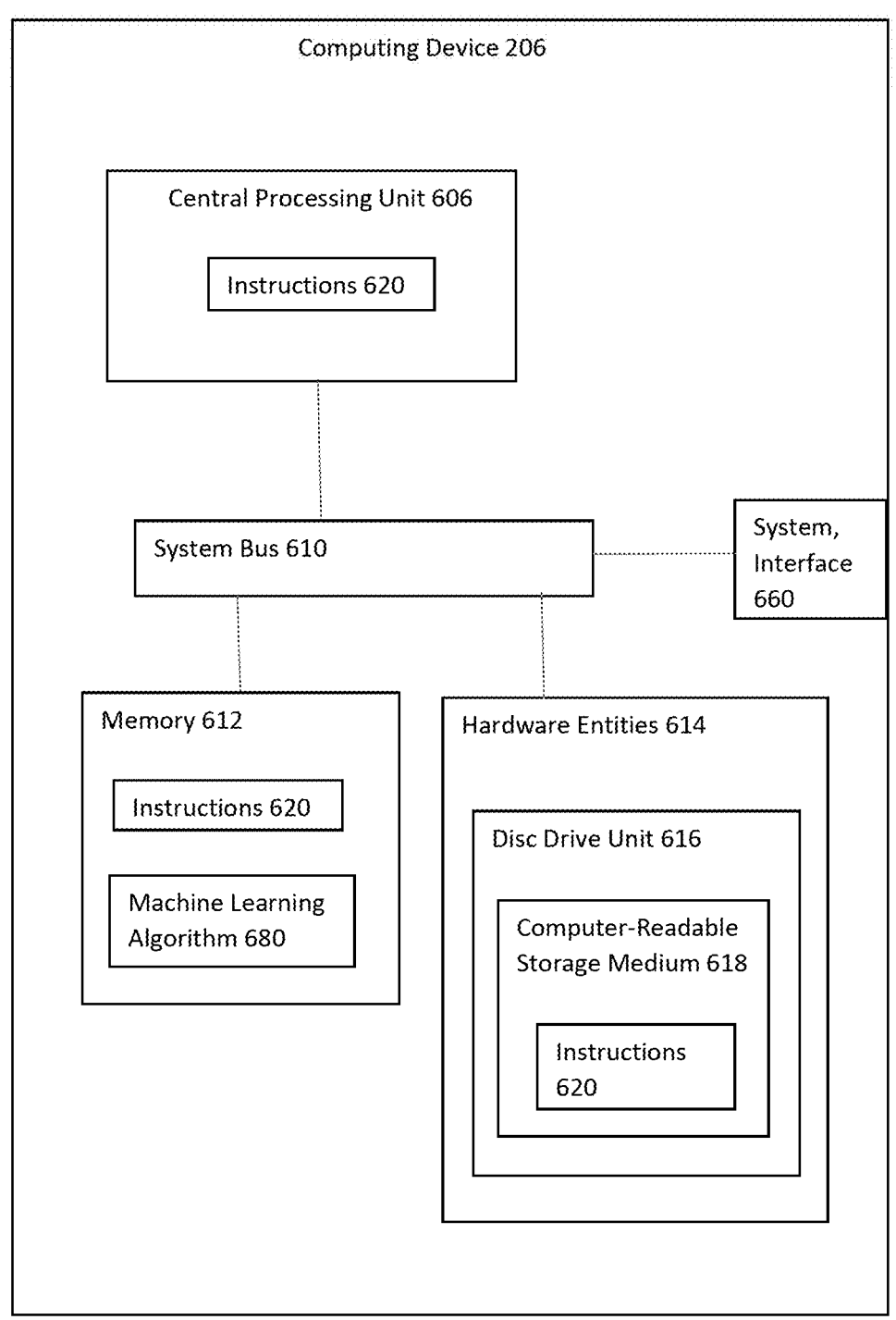
FIG. 3 is a diagrammatic illustration of a computing device of the system shown in FIGS. 1 and 2.

As shown in FIG. 3, the computing device 600 comprises a central processing unit (CPU) 606, a system bus 610, a memory 612 connected to and accessible by other portions of computing device 600 through system bus 610, a system interface 660, and hardware entities 614 connected to system bus 610. System interface 660 is configured to facilitate wired or wireless communications to and from external devices, e.g., network nodes such as access points, etc.

At least some of the hardware entities 614 perform actions involving access to and use of memory 612, which can be a Radom Access Memory ("RAM"), a disk driver and/or a Compact Disc Read Only Memory ("CD-ROM"). Hardware entities 614 can include a disk drive unit 616 comprising a computer-readable storage medium 618 on which is stored one or more sets of instructions 620 (e.g., software code) configured to implement one or more of the methodologies, procedures, or functions described herein. The instructions 620 can also reside, completely or at least partially, within the memory 612 and/or within the CPU 606 during execution thereof by the computing device 600. The memory 612 and the CPU 606 also can constitute machine-readable media. The term "machine-readable media," as used herein, refers to a single medium or multiple media (e.g., a centralized or distributed database, and/or associated caches and servers) that store the one or more sets of instructions 620. The term "machine-readable media," as used herein, also refers to any medium that is capable of storing, encoding or carrying a set of instructions 620 for execution by the computing device 600 and that cause the computing device 600 to perform any one or more of the methodologies of the present disclosure.

The intergranular temperature and humidity sensor 211 is mounted on the housing of the first module 202, so that the intergranular temperature and humidity sensor 211 is exposed to the environment immediately around the first module 202. Thus, the intergranular temperature and humidity sensor 211 is exposed to the granulate material when the first module 202 is immersed in the granulate material. The intergranular temperature and humidity sensor 211 provides readings of the intergranular temperature and humidity of the granulate material, i.e., the temperature and humidity of the air in the interstices between the individual pieces of the granulate material proximate the first module 202.

The computing device 600, upon receiving the outputs of the intergranular temperature and humidity sensor 211 and the first and second moisture sensors 212, 216, determines the moisture level of the granulate material based on predetermined calibration data stored in the computing device 600.

The intergranular temperature and humidity sensor 211 can be configured as two separate sensors in alternative embodiments of the first module 202. Other alternative embodiments can be configured without the intergranular temperature and humidity sensor 211.

The first moisture sensor 212 is mounted on the housing of the first module 202, so that the first moisture sensor 212 is exposed to the environment immediately around the first module 202. Thus, the first moisture sensor 212 is exposed to the granulate material when the first module 202 is immersed in the granulate material.

The first moisture sensor 212 is a capacitive sensor. The use of a capacitive sensor as the first moisture sensor 212 is disclosed for illustrative purposes only. The first moisture sensor 212 can be another type of sensor in alternative embodiments. For example, the first moisture sensor 212 can be a microwave sensor, a near infrared (NIR) sensor, an impedance spectroscopy sensor, etc.

The first moisture sensor 212 includes two electrically-conductive elements 222 in the form of opposing plates or concentric electrodes. The electrically-conductive elements 222 are electrically connected to the computing device 600, which provides an alternating current (AC) voltage to the electrically-conductive elements 222. The electrically-conductive elements 222, when energized, act as electrodes that produce an electric field in the space between the electrically-conductive elements 222.

The space between the electrically-conductive elements 222 acts a sensing area for the first moisture sensor 212. More specifically, granulate material becomes disposed in the space between the electrically-conductive elements 222 when the first module 202 is immersed in the granulate material. Because the dielectric constant of the granulate material is significantly different than the dielectric constant of air, the presence of the granulate material in the sensing area affects the capacitance of the first moisture sensor 212, which in turn affects the current flowing through the capacitive circuit defined by the voltage source, the electrically-conductive elements 222, and the space between the electrically-conductive elements 222, in response to the applied voltage. Also, the amount of moisture present in the granulate material likewise affects the capacitance of the first moisture sensor 212, and the current within the capacitive circuit. The computing device 600 is configured to monitor this current, and to determine the moisture content of the granulate material based on a predetermined relationship between the current, the applied voltage, the intergranular temperature and humidity, and the type of the granulate material. This relationship can be determined based on data generated during a prior calibration, and stored in the computing device 600.

The second moisture sensor 216 is mounted on the housing of the first module 202, so that the second moisture sensor 216 is exposed to the environment immediately around the first module 202. Thus, the second moisture sensor 216 is exposed to the granulate material when the first module 202 is immersed in the granulate material.

The second moisture sensor 216 can be a different type of moisture sensor than the first moisture sensor 212. For example, the second moisture sensor 216 can be a microwave sensor, a near infrared (NIR) sensor, an impedance spectroscopy sensor, etc. in which energy is directed through the sensor 216 and different properties of the granulate material are observed in response thereto. Applicants experimentally have proved that the concurrent use of two or more different types of moisture sensors can yield the benefits inherent to the different physical measurement principles of the different types of moisture sensors, while minimizing their disadvantages. For example, while capacitive moisture sensors can provide accurate measurements over a wide range of moisture levels, the accuracy of a capacitive moisture sensor can be adversely affected by the presence of metal in the granulate material. Such metal contamination often occurs in resin granulates. The accuracy of a microwave sensor, by contract, is not affected by the presence of metal in the resin granulates.

Also, the use of different techniques for determining moisture content can provide information about the granulate material in addition to moisture level, which can increase the useful information available to optimize or otherwise control operation of the process device. For example, it may be possible to identify certain types of materials by a particular parameter that has the same measured value when determined using capacitance and microwave measurements.

In alternative embodiments, the first module 202 can be equipped with only one moisture sensor, i.e., the first module 202 can include the first moisture sensor 212, but not the second moisture sensor 216. In other alternative embodiments, the first and second moisture sensors 212, 216 can be the same type of moisture sensor. In other alternative embodiments, the first module 202 can be equipped with more than two moisture sensors of the same, or different types.

The device 10 includes one force sensor 214. Alternative embodiments of the first module 202 can include more than one force sensor 214. Other alternative embodiments can be configured without a force sensor.

The force sensor 214 is mounted on the housing of the first module 202, so that the force sensor 214 is exposed to the environment immediately around the first module 202. Thus, the force sensor 214 is exposed to the granulate material when the first module 202 is immersed in the granulate material.

The force sensor 214 includes a force plate (not shown); a base (also not shown); and one or more force transducers 224 positioned between the underside of the force plate and the base. The force sensor 214 is depicted in FIG. 1. The base is securely mounted on the housing of the first module 202. The force sensor 214 can have other configurations in alternative embodiments.

The forced sensor 214 is communicatively coupled to the computing device 600, and its force transducer 224 is configured to generate an output that is proportional to an external force applied to the force plate. The force transducer 224 can be, for example, a strain gauge load cell, a piezoelectric sensor, a capacitance gauge load cell, etc. The force transducer 224 generates an output that is proportional to the force exerted on the force plate by the granulate material.

The computing device 600 is configured to adjust the moisture level measurements obtained by the first moisture sensor 212, based on the force readings from the force sensor 214, to compensate for the effects of the compression of the granulate material on the moisture readings. Such compression can be significant, for example, at or near the bottom of a loaded storage vessel such as a Gaylord bin or a grain silo, due to the compressive effect of the weight of the granulate material located above the point of measurement within the storage vessel.

Compression of the granulate material can reduce the spacing between individual pieces of granulate material, which in turn reduces the amount of air between the pieces. Because the dielectric constant of air is significantly different than the dielectric constant of most granulate materials, the compression of the granulate material within the sensing area of the first moisture sensor 212 can affect the capacitance of the first moisture sensor 212, which in turn can affect the moisture readings obtained from the first moisture sensor 212. The accuracy of moisture sensors of other types likewise can be affected by the compression of the granulate material.

The computing device 600 is configured to adjust the moisture readings obtained from the first moisture sensor 212 based on a predetermined relationship between the moisture readings, and the output of the force sensor 214, to compensate for the effects of compaction of the granulate material.

In addition, the degree of compression of the granulate material can be used to determine the bulk density of the granulate material. More specifically, because the sample volume of the granulate material is fixed, i.e., known, any deviation in the measured force from a baseline value for a particular material type can be correlated with a change in the bulk density of the sample from a corresponding baseline value. The computing device 600 can be programmed with data correlating the force readings from the force sensors 36 with the bulk density for particular material types. The computing device 600 can use this correlation to determine the bulk density of the sampled material. In applications involving granulates of plastic resin, the extent of any deviations in the bulk density of the sample from the bulk density of virgin granulates can provide an indication of the percentage of regrind that may be present in the sample.

The gyroscope 218 is mounted within the housing of the first module 202, and provides an indication of the orientation of the first module 202. This information can be used by the computing device 600 to compensate for changes in the respective outputs of the first and second moisture sensors 212, 216 caused by the orientation of the first module 202 at the time the moisture measurements are being acquired. For example, in the case of a hand-held vacuum wand with the first module 202 mounted thereon, the orientation of the first module 202 can affect the compaction of the granulate material within the sensing area of the first moisture sensor 212, which in turn can affect the moisture readings generated by the first moisture sensor 212. The computing device 600 is configured adjust the moisture readings based on a pre-determined relationship between the moisture readings and the orientation of the device 10, to compensate for the effect of the orientation of the first module 202 on the moisture readings.

The computing device 600, after adjusting the as-measured moisture readings to account for compression of the granulate material and the orientation of the first module 202, can transmit the adjusted moisture readings to a process device to which the granulate material is to be conveyed. The transmission can be made on a real-time or near real-time basis following the acquisition and adjustment of the moisture readings. For example, in applications where the granulate material is resin granulates to be dried in a resin dryer, the adjusted moisture readings can be transmitted to the resin dryer. As discussed below, the resin dryer can use the adjusted moisture readings to optimize or otherwise modify the drying process so as to tailor the drying parameters to the specific moisture levels of the granulate material.

In alternative embodiments, a three-axis accelerometer (not shown) can be used in lieu of, or in combination with, the force sensor 214 to determine the compaction of the granulate material. The accelerometer is configured to generate outputs indicative of the acceleration of the first module 202 along three orthogonal axes. The computing device 600 can be configured to calculate the external force exerted on the first module 202 by the granulate material, based on the acceleration readings and the known mass of the first module 202. The computing device 600 can be further configured to determine the compression of the granulate material based on a pre-determined correlation between the force readings and the compression of the granulate material.

Also, the readings of the accelerometer can be used to determine whether the first module 202 previously had been dropped, hit, or otherwise mishandled. If so, the user can be alerted that the first module 202 may be compromised.

Referring to FIG. 1, the second module 204 includes a housing (not shown). The second module 204 also includes a temperature sensor 232 and a humidity sensor 234 mounted within the housing. The housing has ports or other features formed therein to place the temperature sensor 232 and the humidity sensor 234 in fluid communication with the ambient environment around the second module 204.

As noted above, the second module 204 is not immersed in the granulate material, and is exposed to the environment around the granulate material during use. The temperature sensor 232 and the humidity sensor 234 thus measure the respective temperature and humidity levels of the environment around the granulate material. The computing device 600 is configured to use the as-measured temperature and humidity in the manners discussed below. Alternative embodiments of the second module 204 can include additional sensors, such as a pressure sensor configured to sense the pressure of the environment around the granulate material.

The second module 204 also includes a transmitter 236 configured to transmit the adjusted moisture levels, and other measured and calculated parameters, generated by the system 200. As shown in FIG. 1, the transmitter 236 is communicatively coupled to the computing device 600. The moisture levels and the other measured and calculated parameters can be transmitted using a wired means and a suitable protocol such as Ethernet, Modbus, etc.; or using a suitable wireless means such as Bluetooth®, WiFi, Zigbee, LTE, etc. The term "transmitter," as used herein, is intended to encompass wired and wireless transmitters, and transceivers.

The second module 204 further includes a user interface 238, depicted in FIG. 1. The user interface can include input devices and output devices that facilitate user-software interactions for controlling operations of the system 200. The input devices include, but are not limited to, a physical and/or touch keyboard. The input devices can be connected to the computing device 600 via a wired or wireless connection, e.g., a Bluetooth® connection. The output devices include, but are not limited to, a display. The system 200 can be further configured to permit the user to interface with the system 200 via a smartphone or other external device. Alternative embodiments of the system 200 can be configured without a user interface. In such embodiments, the user interface can be provided, for example, by the process device.

Measuring the moisture level in the granulate material at the storage vessel, e.g., the Gaylord bin, upstream of the entrance to the process device, e.g., the dryer 100, and providing the adjusted moisture levels to the dryer on a real-time or near real-time basis, can allow the dryer to change one or more of the drying parameters before the resin granulates reach the dryer. For example, the temperature, dew point, and/or flowrate of the drying air, and/or the residence time of the resin granulates in the dryer can be varied prospectively, to accommodate changes in the moisture level in the resin granulates reaching the dryer. Such prospective control of the drying parameters can potentially improve the effectiveness and efficiency of the drying process, which in turn can reduce the energy consumed by the process, and/or the time needed to dry the resin granulates (resulting in greater throughput for the dryer). Also, greater control of the drying process can increase the accuracy to which the drying process can dry the resin granulates to a target moisture level, which in turn can reduce the potential for the resin pellets to be processed in an under-dried or over-dried condition.

Also, in applications where the computing device 600 is programmed with information regarding the operational characteristics of the process device, e.g., the dryer, the computing device 600 can be configured to determine whether the dryer is capable of drying the granulate material, i.e., whether the dryer has sufficient drying capacity to dry the granulate material to the desired level, based on the moisture content of the granulate material as determined by the system 200. If the moisture level of the granulate material exceeds the capacity of the dryer, i.e., if the granulate material is out of specification for the dryer and cannot be dried to a satisfactory level regardless of any possible combination of operating parameters of the dryer, the system 200 can issue a notification that the granulate material is out of specification and cannot be dried at that time. Also, the system 200, thorough the computing device 600, can be configured to provide alternate suggestions that would allow the out-of-specification granulate material to be dried. (In alternative embodiments, one or more of the computational activities noted in this paragraph can be performed by the dryer instead of, or in addition to, the system 200.)

Figure 4:
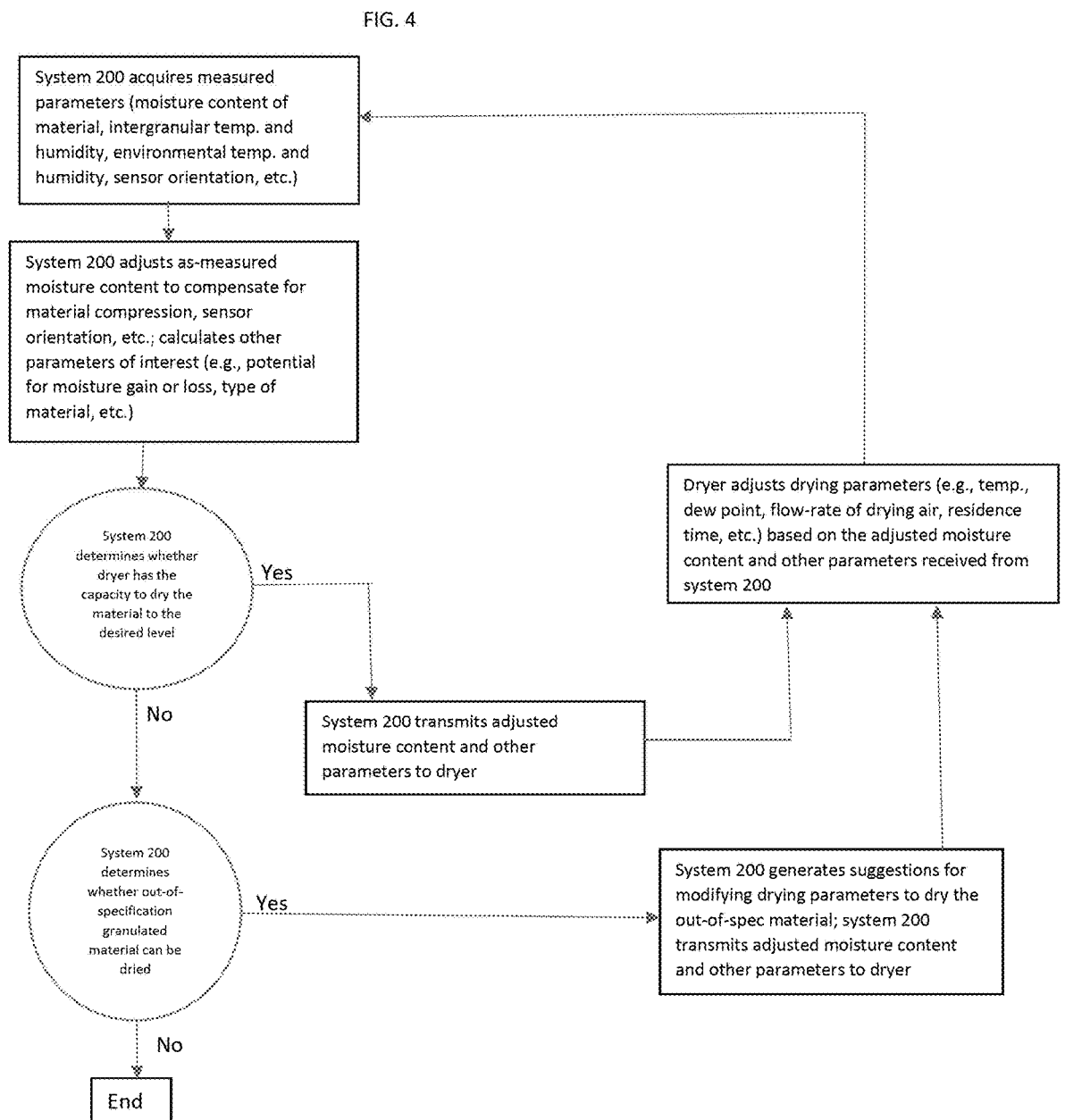
FIG. 4 is a flow chart depicting a process in which adjusted moisture readings generated by the system shown in FIGS. 1-3 are provided to, and used by a dryer to help control a drying process.

If desired, the moisture readings and other measured parameters can be acquired at periodic intervals, so that the process device can receive updated information regarding the moisture content and other qualities of the granulate material. For example, FIG. 4 is a flow chart depicting a process in which the adjusted moisture readings generated by the system 200 are provided to, and used by a dryer to help optimize and otherwise control the drying process.

Also, the first and second moisture sensors 212, 216 can provide real-time or near real-time moisture readings. And the use of two independent moistures sensors can reduce the frequency with which the system 200 needs to re recali-brated with respect to moisture measurement, and potentially can eliminate the need for any such calibration during normal operation of the system 200.

The computing device 600 can be configured to use the intergranular humidity and temperature readings from the intergranular temperature and humidity sensor 211 to determine the affinity of the granulate material to moisture regain, and also, to identify the specific type of granulate material from which the measurements were obtained. For example, granulates in the Nylon family have a relatively high potential for moisture regain. Thus, such granulates having a relatively low initial moisture will gain moisture over time within a storage vessel, even where the intergranular material humidity is relatively low. By contrast, granulates like polycarbonates have a low potential for moisture regain. Thus, polycarbonate granulates having a relatively low initial moisture will not gain substantial moisture over time within the storage vessel, even where the intergranular material humidity is relatively high.

Where the type of the granulate material is unknown, the computing device 600 can be used to identify the type of material as follows. The computing device 600 can be programmed with data correlating the change in moisture level over time for various types granulate materials, with the ratio of the environmental humidity to the intergranular humidity (where the environmental and intergranular humidity are determined respectively by the humidity sensor 234 and the intergranular temperature and humidity sensor 211). Based on this correlation, the computing device 600 can recognize a specific change in moisture content over time as a function of the environmental and intergranular humidity, as an identifier of a specific type of material. This information can be displayed, archived, sent to the operator of the process machinery to which the granulate material will be conveyed, etc.

When the type of the granulate material is known, the computing device 600 can use the change in the measured moisture level over time, as a function of the ratio of the environmental humidity to the intergranular humidity, to generate an algorithm for predicting the change in the moisture content over time for that particular granulate material. This information can be displayed, archived, sent to the operator of the process machinery to which the granulate material will be conveyed, etc.

The computing device 600 can be further configured to use the environmental temperature and humidity levels from the respective temperature sensor 232 and humidity sensor 234, the material type of the granulate material, and the conveying distance between the location of the first module 202 and the process device to determine the moisture gain of the granulate material as the material is conveyed to the process device. The determination can be based on a pre-determined relationship between the moisture gain for the specific type of material, the temperature and humidity of the environment about the granulate material, and the conveying distance. The computing device 600 can further adjust the measured moisture level of the granulate material to compensate for the moisture gain (or loss) projected to take place between the location of the first module 202 and the process device. In applications were the first module 202 is located in a storage vessel, the computing device 600 will adjust the measured moisture level to compensate for the moisture gain (or loss) projected to take place between the storage vessel and the process device.

In some applications, multiple sensing systems 200 can be placed at multiple locations along the material transfer path of a plant, upstream of the processing device, e.g., upstream of a dryer to be used to remove moisture from the granulate material. In such applications, a machine learning algorithm 680 residing in the computing device 600, as depicted in FIG. 3, or other means can be used to "learn" the specific operational characteristics of the plant based on the data acquired by the systems 202, so that the operation of the plant can be improved over time.

Device 10

FIGS. 5-12 depict an implementation of the system 200 as part of a device 10 for drawing, or picking up, a granulate material from a storage vessel or other source of the granulate material is disclosed herein. The device 10 is configured to be connected to a vacuum source 13 by way of a hose (not shown) or other suitable means, so that the granulate material in drawn into, and through the device 10 by the vacuum. The vacuum source 13 and the hose are depicted diagrammatically in FIG. 12. The device 10 can be used, for example, to pick up granulates 11 of plastic resin material from a storage vessel in the form of a Gaylord storage bin 12, so that the resin granulates 11 can be conveyed to a process device such as a resin dryer 100 depicted diagrammatically in FIG. 12. This example of an implementation of the system 200 is presented for illustrative purposes only. The system 200 can be implemented into other type of devices and systems, and can be used in other applications, including applications in which the resin granulates or other granulate materials are conveyed under pressure, or by gravity.

The use of the device 10 to pick up granulates 11 of plastic resin material from a Gaylord storage bin 12, so that the resin granulates 11 can be conveyed to a resin dryer 100, is presented for illustrative purposes only. The device 10 can be used to pick up other types of materials from other sources, and can be used in industrial processes other than plastics production. For example, the device 10 can be used to pick up agricultural grains from a railcar, so that the grains can be conveyed to a grain silo. Also, the device 10 can be used to pick up granulate materials from storage vessels other than Gaylord bins 12, such as vacuum takeoff boxes (VTBs), vacuum takeoff assemblies (VTAs), day bins, silos, etc.

Figure 5:
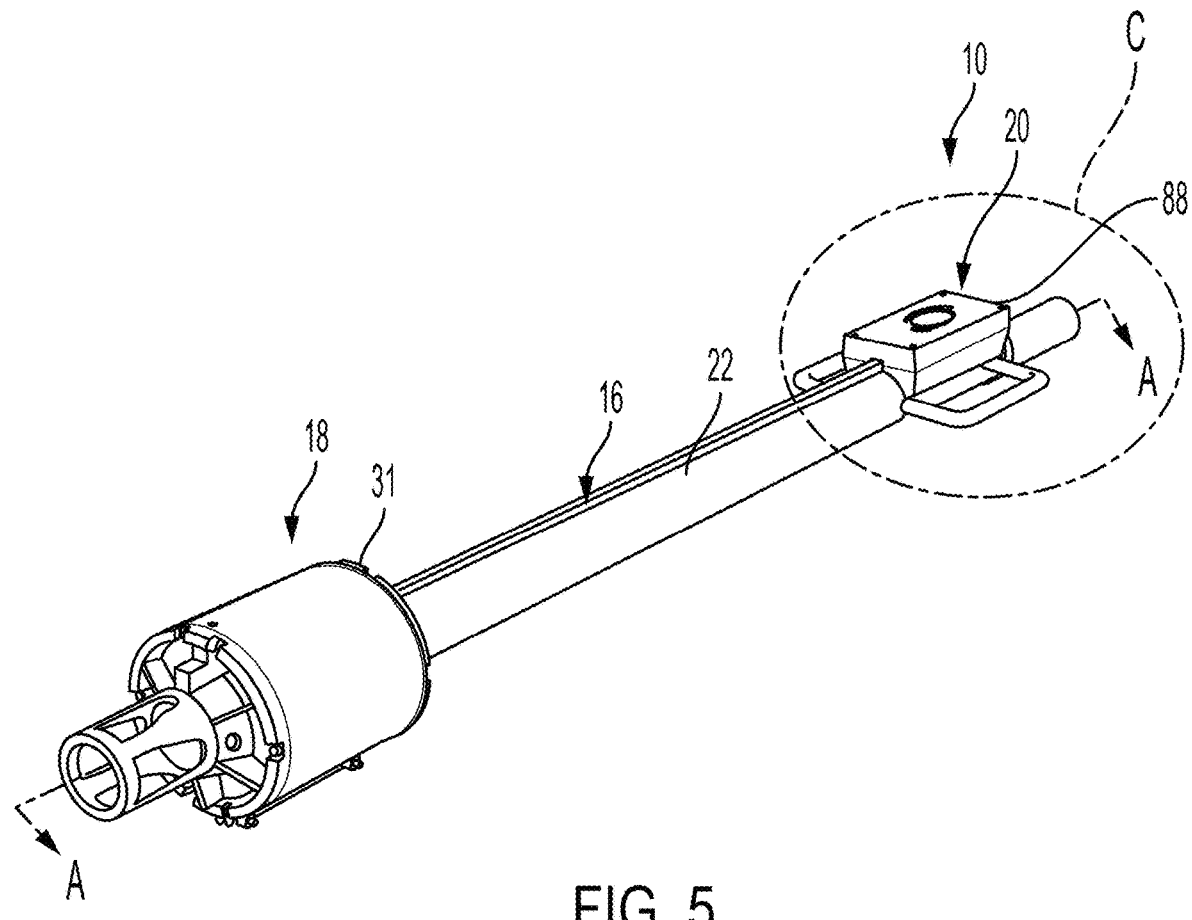
FIG. 5 is a perspective view of a device for determining the moisture level in a granulate material, with the device implementing the system shown in FIGS. 1-4.
Figure 6:
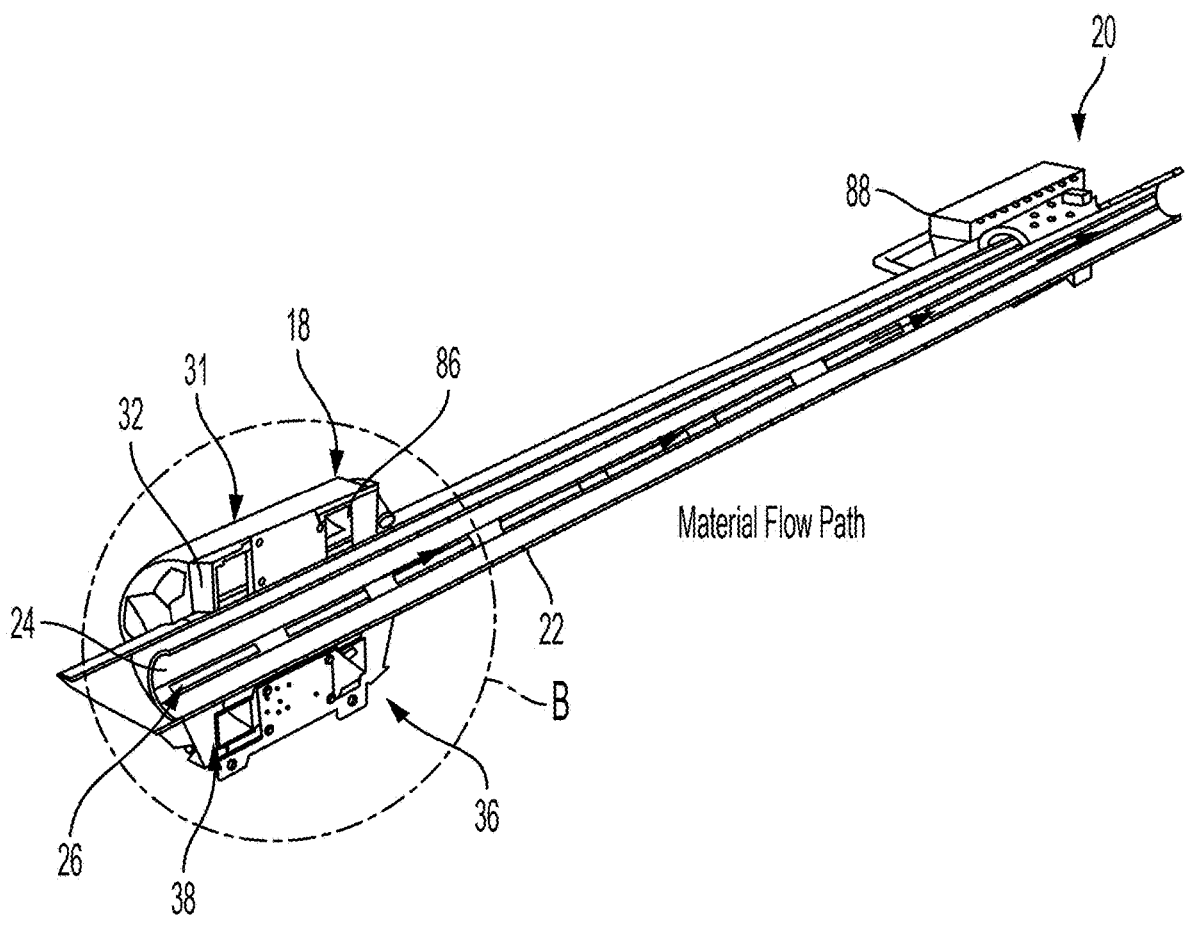
FIG. 6 is a cross-sectional view of the device shown in FIG. 5, taken through the line "A-A" of FIG. 1.

Referring to FIGS. 5 and 6, the device 10 includes a probe or wand 16; a first module 18; and a second module 20. The first module 18 is mounted on the exterior of the wand 16, proximate a first, forward, or upstream end of the wand 16. The second module 20 is mounted on the exterior of the wand 16, proximate a second, rearward, or downstream end of the wand 16. The device 10 also includes a conduit 23 secured to an outer surface of the outer member 22. The conduit 23 extends between the first module 18 and the second module 20, and houses a cable 25, visible in FIG. 8, that electrically connects the first and second modules 18, 20.

Figures 8, 9:
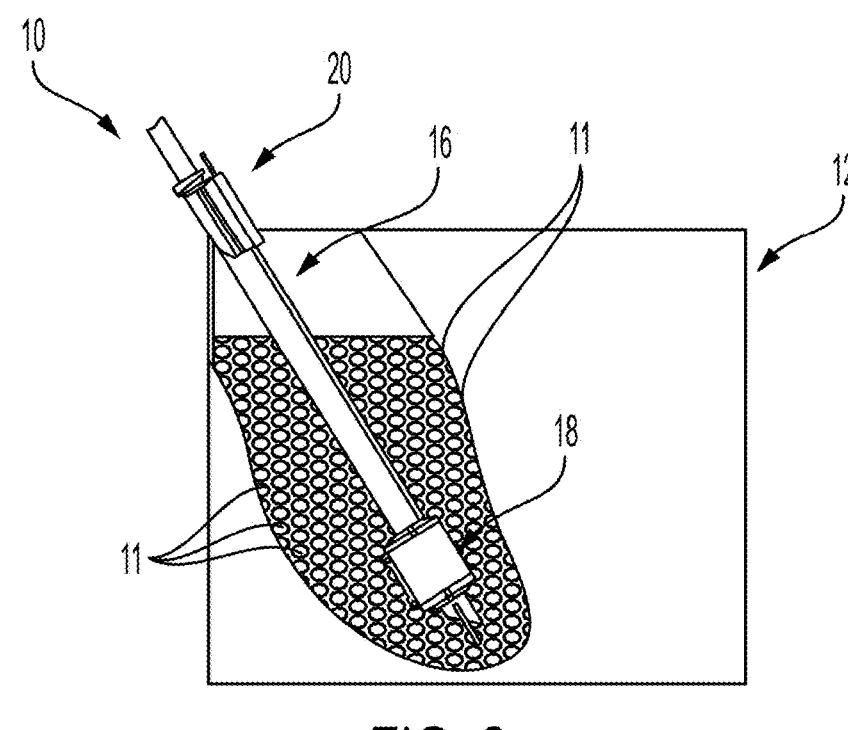
FIG. 8 is a side view of the device shown in FIGS. 5-7, depicting the device partially immersed in resin granulates within a storage vessel.
FIG. 9 is a magnified view of the area designated "C" in FIG. 5.

Referring to FIG. 8, the device 10 is partially immersed in the resin granulates 11 during use, so that the forward end of the wand 16 and the first module 18 are fully immersed in the resin granulates 11. The rearward end of the wand 16 and the second module 20 are not immersed in the resin granulates, and thus are exposed to the environment around the resin granulates 11. As discussed below, the first module 18 is configured to measure the moisture content of the resin granulates 11, the intergranular temperature and humidity levels within the supply of resin granulates 11, the extent to which the resin granulates 11 may be compressed within the Gaylord bin 12, and the orientation of the device 10. As also discussed below, the device 10 can be configured to adjust the as measured moisture levels to compensate for factors such as the compression of the resin granular granulates and the orientation of the device 10.

The second module 20 is configured to measure the temperature and humidity of the air in the environment around the Gaylord bin 12. In addition, the second module 20 is configured to transmit the adjusted moisture content of the resin granulates 11 to the dryer 100 (or other process device), by a wired or wireless means. In alternative embodiments, the second module 20 can include a display that allows the adjusted moisture level and other measured and calculated parameters to be displayed on the device 10.

Figure 11:
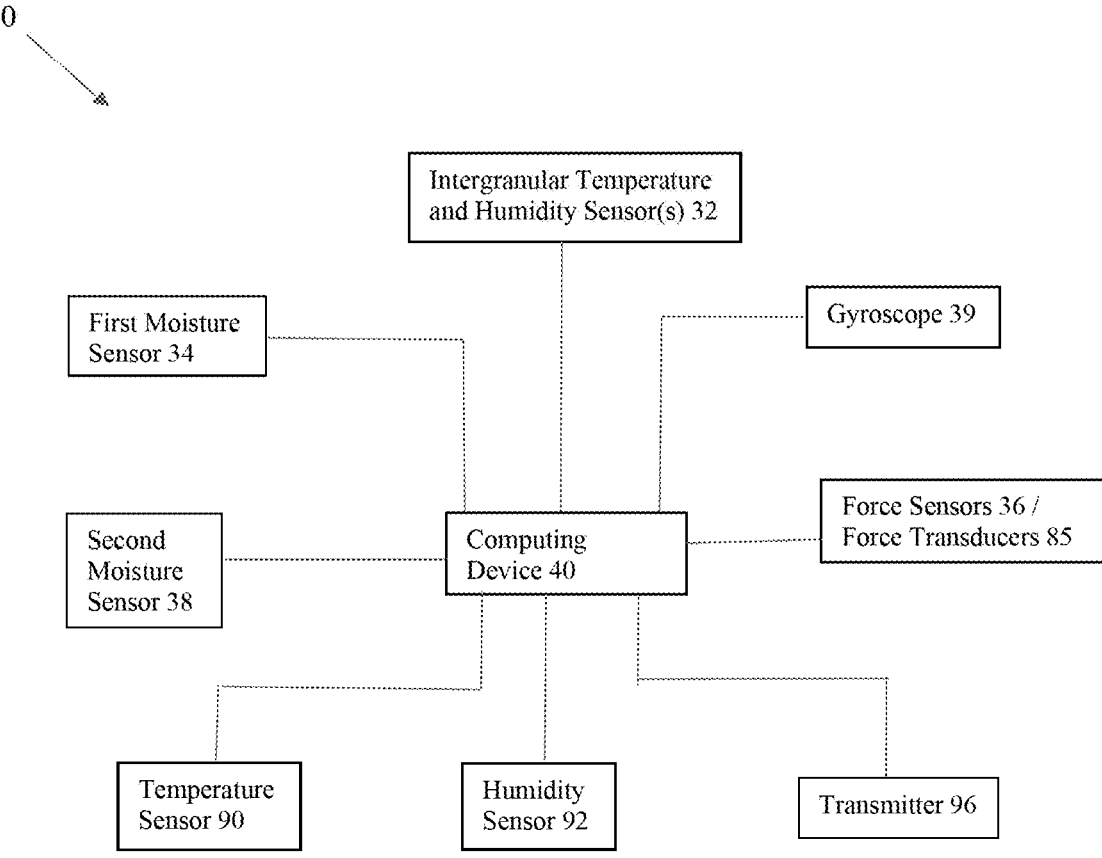
FIG. 11 is a diagrammatic view of various electrical and electronic components of the device shown in FIGS. 5-10.
Figure 12:
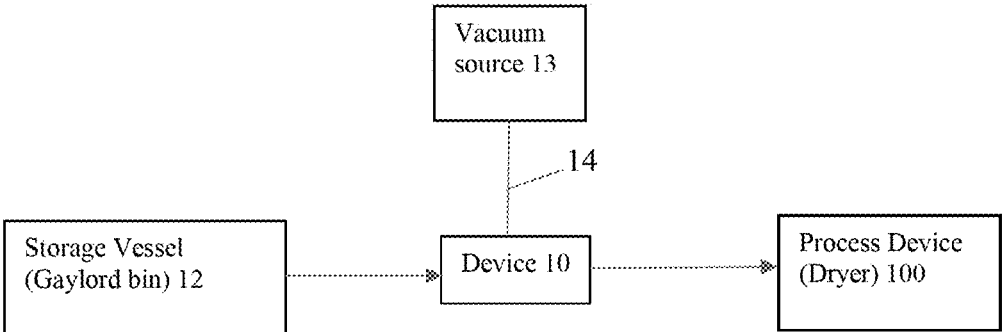
FIG. 12 is a diagrammatic view of the device shown in FIGS. 5-11, and a storage vessel and process device associated with the device shown in FIGS. 5-11.

The device also includes a computing device 40, depicted in FIG. 11. The computing device 40 can be substantially identical to the computing device 600, and can perform the various computational functions discussed above in relation to the computing device 600. For example, the computing device 40 can be configured to adjust the moisture level measurements obtained by the device 10 to correct for compression of the resin granulates 11 and the orientation of the device 10, as discussed above in relation to the system 200.

The computing device 40 is mounted on the second module 204. The computing device 40 can be mounted on the first module 202 in alternative embodiments. In other alternative embodiments, elements of the computing device 40 can be mounted on both the first module 202 and the second module 204.

Figure 7:
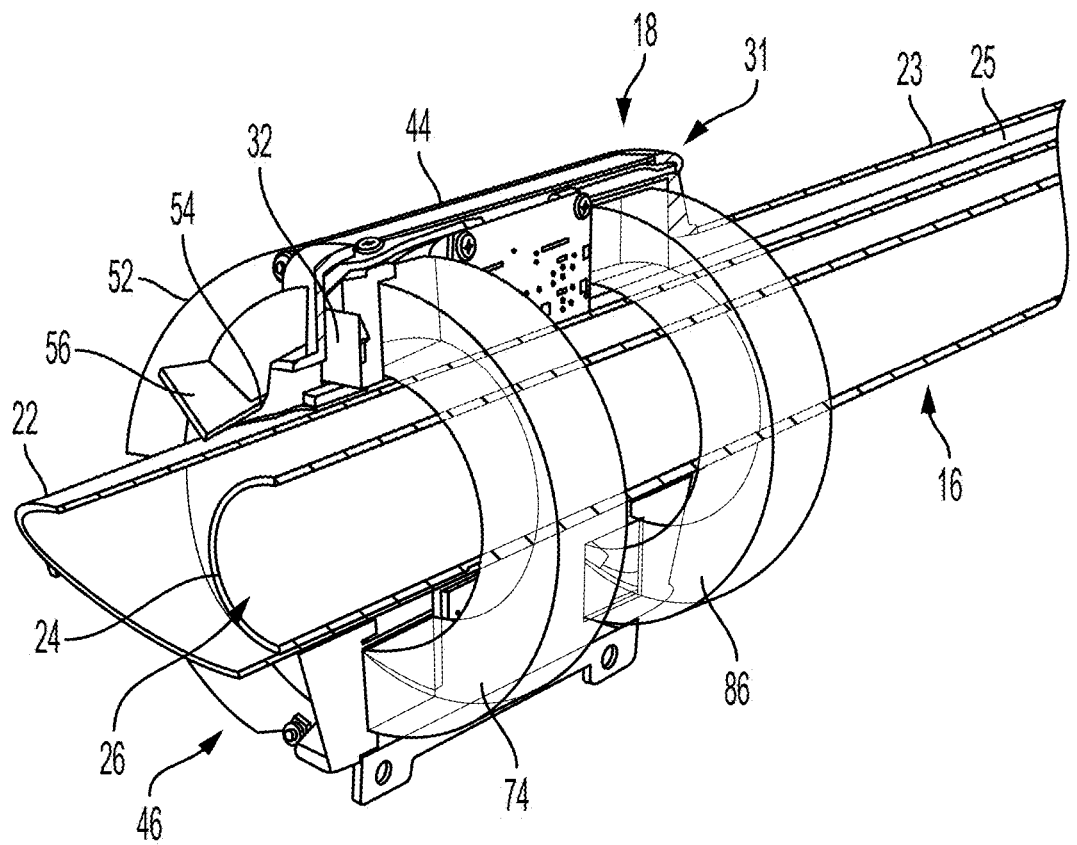
FIG. 7 is a magnified perspective view of the area designated "B" in FIG. 6.

Referring to FIGS. 5-7, the wand 16 has a first tubular member in the form of an inner member 24, and a second tubular member in the form of an outer member 22. The inner member 24 is positioned within, and is connected to the outer member 22. In particular, a bottom portion of the outer surface of the inner member 24 is attached to a bottom portion of the inner surface of the outer member 22. The outer member 22 and the inner member 24 can be formed from a rigid, durable material such as aluminum or stainless steel.

The rearward end of the inner member 24 is configured to be connected to the hose by a quick-connect coupling (not shown) or other suitable means. The inner member 24 defines an internal passage 26 that extends along the length of the inner member 24. The passage 24 is visible in FIGS. 6 and 7. The passage 24 forms a flow path for the resin granulates 11 as the resin granulates 11 are drawn into, and through the device 10 in response to the vacuum applied to the inner member 24. The passage 24 has a circular cross section. The passage 24 can have cross sections of other shapes, e.g., square or rectangular, in alternative embodiments.

The first module 18 includes a housing 31 securely mounted on the exterior surface of the outer member 22. The first module 18 also includes an intergranular temperature and humidity sensor 32; a first, or primary moisture sensor 34; one or more force sensors 36; a second, or secondary moisture sensor 38; and a three-axis gyroscope 39 each mounted on the housing 31.

Referring to FIGS. 5-7, the housing 31 comprises a body 42, and a cover 44. The body 42 and the cover 44 can be formed from a durable, impact-resistant material such as high-impact plastic.

The body 42 is positioned on, and over the outer member 22 of the wand 16, and is secured to the outer member 22 by fasteners or other suitable means. The body 42 defines a plurality of circular, centrally-located openings that receive the outer member 22 of the wand 16. The openings are sized so that the body 42 fits over the outer member 22 with minimal clearance, as can be seen in FIG. 7.

The intergranular temperature and humidity sensor 32 is communicatively coupled to the computing device 40. As can be seen in FIG. 7, the intergranular temperature and humidity sensor 32 is mounted on the body 42, so that the intergranular temperature and humidity sensor 32 is exposed to the environment immediately around the first module 18. The intergranular temperature and humidity sensor 32 provides readings of the intergranular temperature and humidity of the resin granulates 11 when the first module 18 is immersed in the resin granulates 11.

Because the wand 16 typically is inserted into the supply of resin granulates 11 so that the bottom of the wand 16, and the first module 18, are located at or near the bottom of the Gaylord bin 12 (or other storage vessel), as shown in FIG. 8, the intergranular temperature and humidity sensor 32 provides an indication of the intergranular temperature and moisture at or near the bottom of the Gaylord bin 12.

The first moisture sensor 34 is a concentric capacitive sensor. The use of a capacitive sensor as the first moisture sensor 34 is disclosed for illustrative purposes only. The first moisture sensor 34 can be another type of sensor in alternative embodiments. For example, the first moisture sensor 34 can be a microwave sensor, a near infrared (NIR) sensor, an impedance spectroscopy sensor, etc.

Referring to FIGS. 6 and 7, the first moisture sensor 34 comprises a first, or outer electrode 70; and a second, or inner electrode 72. The inner electrode 72 is located concentrically within the outer electrode 70, so that the outer electrode 70 and the inner electrode 72 define an anulus therebetween. The outer and inner electrodes 70, 72 are mounted securely on the body 42 of the housing 31, proximate a forward, or upstream end of the body 42.

The outer and inner electrodes 70, 72 are formed from an electrically-conductive material, and are electrically connected to the computing device 40, which provides an alternating current (AC) voltage across the outer and inner electrodes 70, 72. The outer and inner electrodes 70, 72 define an annulus 74 that receives resin granulates 11 when the first module 18 is immersed in the resin granulates 11.

The annulus 74 acts a sensing area for the first moisture sensor 34, allowing the computing device 40 to determine the moisture content of the resin granulates 11 within the annulus 74 as discussed above in relation to the first moisture sensor 212 of the system 200.

The force sensors 36 and the second moisture sensor 38 are mounted on a rearward, or downstream portion the body 42 of the housing 31. The second moisture sensor 38 can be a concentric capacitance sensor that is substantially identical to the first moisture sensor 34, with the following exceptions. The second moisture sensor 38 comprises a first, or outer electrode 80 and a second, or inner electrode 82 located concentrically within the outer electrode 80. The outer and inner electrodes 80, 82 are substantially identical to the outer and inner electrodes 70, 72 of the first moisture sensor 34, with the exception that the outer and inner electrodes 80, 82 have openings 84 formed therein to accommodate the force sensors 36. The openings 84 are depicted in FIG. 10.

The outer and inner electrodes 80, 82 define an anulus 86 that receives resin granulates 11 when the first module 18 is immersed in the resin granulates 11. The outer and inner electrodes 80, 82 are electrically connected to the computing device 40, which provides an alternating voltage across the outer and inner electrodes 80, 82, and determines the moisture content of the resin granulates within the annulus 86 in the manner discussed above in relation to the first moisture sensor 212 of the system 200.

The second moisture sensor 38 can be another type of sensor in alternative embodiments. For example, the second moisture sensor 38 can be a microwave sensor, an NIR sensor, an impedance spectroscopy sensor, etc. In other alternative embodiments, the first module 18 can be equipped with only one moisture sensor, i.e., the first module 18 can include the first moisture sensor 34, but not the second moisture sensor 38. In other alternative embodiments, the first module 18 can be equipped with more than two moisture sensors of the same, or different types.

Figure 10:
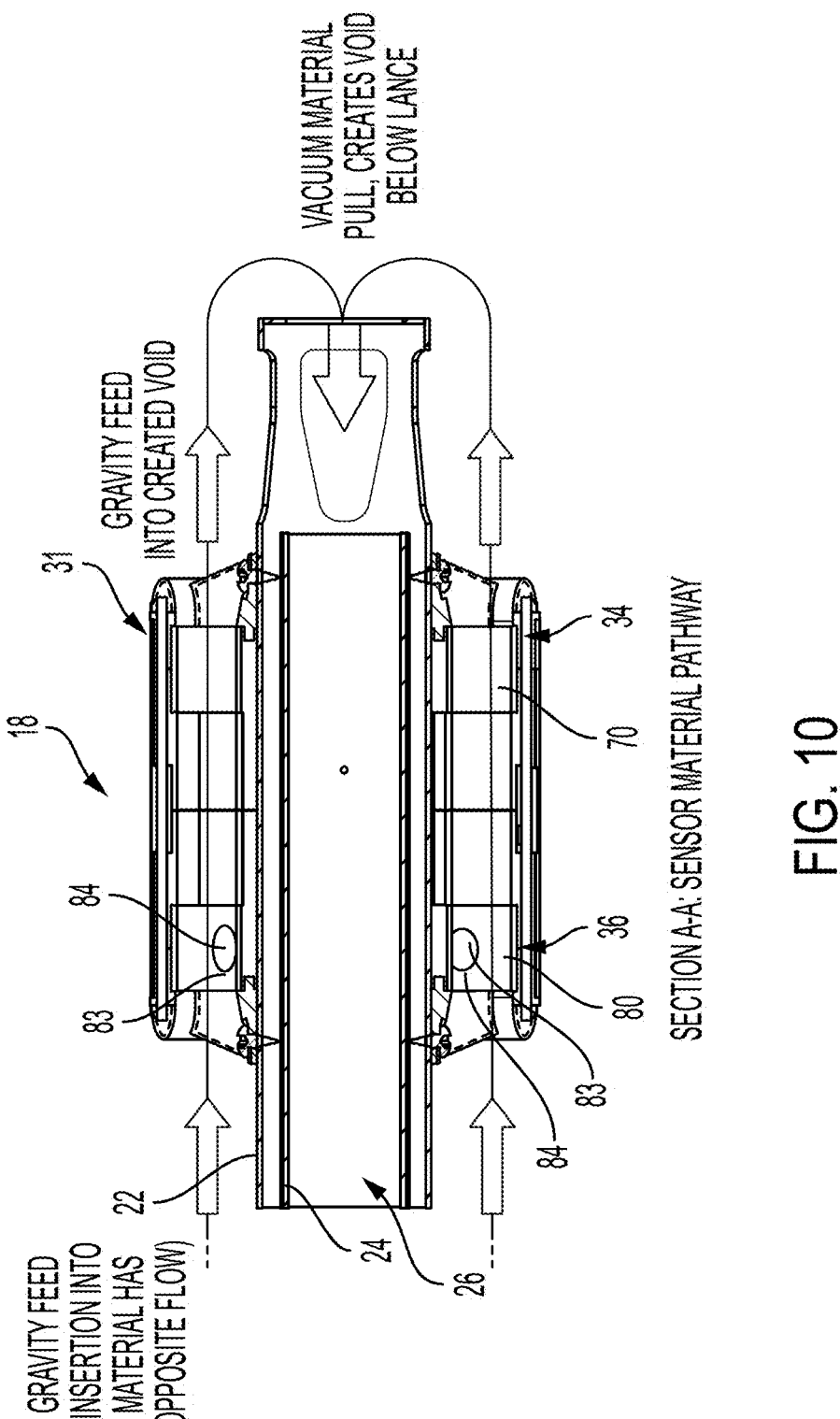
FIG. 10 is a magnified side view of the area designated "B" in FIG. 6, depicting a path of resin granulates through the device.

FIG. 10 depicts the material flow around, and into the wand 16 when the wand 16 is being subjected to a vacuum from the vacuum source 13. (It is noted that the above-noted moisture measurements are obtained from the device 10 when the resin granulates 11 are in a static condition within the annuli of the 74, 86 of the first and second moisture sensors 34, 38, i.e., when a vacuum is not being drawn through the wand 16.)

As noted above, the forward end of the device 10 is inserted into the resin granulates 11 in the Gaylord bin or other storage device as shown in FIG. 8, so that the first module 18 is immersed completely in the resin granulates 11. When a vacuum is being drawn through the passage 26 within the inner member 24, the vacuum causes resin granulates 11 immediately adjacent the forward end of the wand 16 to be drawn into, or entrained in the passage 26. As depicted diagrammatically in FIG. 10, the resulting void of resin granulates 11 around the forward end of the wand 16 causes resin granulates 11 located above the void to be drawn downward due to gravity, which in turn causes at least some of the resin granulates 11 to enter, and travel through the housing 31 of the first module 18.

As can be seen in FIGS. 5, 6, and 10, the body 42 of housing 31 has a hub and spoke configuration that facilitates passage of the resin granulates 11 into, and through the housing 31. More specifically, as shown in FIG. 10, the resin granulates 11 can enter the housing 31 by way of the rearward end of the housing 31. After entering the housing 31, the resin granulates 11 pass through the annulus 86 defined by the second moisture sensor 38, and subsequently enter and pass through the annulus 74 defined by the first moisture sensor 34. After passing through the annulus 74, the resin granulates 11 exit the housing 31 by way of the forward end of the housing 31, and subsequently become entrained by the wand 16 in response to the vacuum within the passage 26 defined by the inner member 24 of the wand 16. In addition, other resin granulates 11 proximate the forward end of the wand 16 can enter the passage 26 directly, without passing through the housing 31.

The device 10 includes four of the force sensors 36. The force sensors 36 are depicted diagrammatically in FIG. 11. Alternative embodiments can include less, or more than four of the force sensors 36. Each force sensor 36 includes a force plate 83, visible in FIG. 10; a base (not shown); and one or more force transducers 85 positioned between the underside of the force plate 83 and the base. The force transducers are depicted in FIG. 11. The base is securely mounted on the rearward portion of the body 42 of the housing 31, proximate a corresponding one of the outer or inner electrodes 80, 82. As shown in FIG. 10, each force plate 83 is located within a corresponding one of the openings 84 formed in the outer and inner electrodes 80, 82, so that the outwardly-facing surface of the force plate 83 faces the passage 26 in the inner member 24.

The force transducers 85 are configured to generate an output that is proportional to an external force applied to the force plate 83. The force transducers 85 can be, for example, strain gauge load cells, piezoelectric sensors, capacitance gauge load cells, etc. The force sensors 36 are communicatively coupled to the computing device 40. The computing device 40 is configured to adjust the moisture-level measurements obtained by the first and second moisture sensors 34, 38 based on the force readings from the force sensors 36 to compensate to for the effects of compression of the resin granulates 11, as discussed above in relation to system 200.

The gyroscope 39 is depicted diagrammatically in FIG. 11. The gyroscope 39 is communicatively coupled to the computing device 40. The gyroscope 39 provides an indication of the orientation of the device 10. The computing device 40 is configured to compensate for the changes in the moisture measurements generated by the moisture sensor 34, 38 due to compression of the resin granulates 11 caused by the specific orientation of the device 10 in relation to the Gaylord bin 12 (or other storage device), as discussed above in relation to the system 200.

In alternative embodiments, a three-axis accelerometer (not shown) can be used in lieu of, or in combination with, the force sensors 36 to determine the compression of the resin granulates 11, as discussed above in relation to the system 200.

Referring to FIG. 5, the second module 20 includes a housing 88. The housing 88 is securely mounted on the outer member 22 of the wand 16, proximate the downstream end of the wand 16. The second module 20 also includes a temperature sensor 90 and a humidity sensor 92 mounted within the housing 88. The housing 88 has ports 94 formed therein to place the temperature sensor 90 and the humidity sensor 92 in fluid communication with the ambient environment around the second module 20. The temperature sensor 90 and the humidity sensor 92 are communicatively coupled to the computing device 40. The computing device 40 is mounted within the housing 31.

As noted above, the device 10 is partially immersed in the resin granulates 11 during use, so that the second sensor module 20 is not immersed in the resin granulates 11, and is exposed to the environment around the resin granulates 11 as depicted in FIG. 8. The temperature sensor 90 and the humidity sensor 92 thus measure the respective temperature and humidity levels of the environment around the resin granulates 11 residing in the Gaylord bin 12. The computing device 40 is configured to process the temperature and humidity measurements in the manner discussed above in relation to system 200.

The computing device 40 also includes a transmitter 96 configured to transmit the adjusted moisture levels, and other measured and calculated parameters, generated by the first module 18 and the second module 20. The transmitter 96 is depicted diagrammatically in FIG. 11. The information can be transmitted to the dryer 100, to a central controller of a plant in which the dryer 100 is located, or to another destination. The information can be transmitted using a wired means and a suitable protocol such as Ethernet, Modbus, etc.; or using a suitable wireless means such as BLUETOOTH, WiFi, Zigbee, LTE, etc. The term "transmitter," as used herein, is intended to encompass wired and wireless transmitters, and transceivers.

Measuring the moisture level in the resin granulates 11 at the storage vessel, e.g., the Gaylord bin 12, upstream of the entrance to the dryer 100, and providing the adjusted moisture levels to the controller of the dryer 100 (or other controller) on a real-time or near real-time basis, can allow the dryer 100 to change one or more of the drying parameters before the resin granulates 11 reach the dryer 100. For example, the temperature, dew point, and/or flowrate of the drying air, and/or the residence time of the resin granulates 11 in the dryer 100 can be varied prospectively, to accommodate changes in the moisture level in the resin granulates 11 reaching the dryer 100. Such prospective control of the drying parameters potentially can improve the effectiveness and efficiency of the drying process, which in turn can reduce the energy consumed by the process, and/or the time needed to dry the resin granulates 11 (resulting in greater throughput for the dryer 100). Also, greater control of the drying process can increase the accuracy to which the drying process can dry the resin granulates 11 to a target moisture level, which in turn can reduce the potential for the resin pellets 11 to be processed in an under-dried or over-dried condition.

Figure 13:
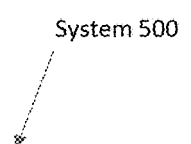
FIG. 13 is a diagrammatic view of a system for determining a range of drying times needed to dry a granulate material.

FIGS. 13 and 14 depict a system 500 and a process 502 for determining a range of drying times, including a maximum drying time, needed to dry a granulate material, such as resin granulates, to a desired or targeted moisture content, based on the moisture content of the granulate material measured prior to the drying process.

The system 500 can incorporate the various components of the moisture sensing system 200 as described above, including the various sensors that provide the measured parameters noted above. The use of the system 500 in connection with the components of the moisture sensing system 200 is described for illustrative purposes only. The system 500 can be used with other systems, devices, and components capable of providing some, or all of the sensed parameters discussed below, including the device 10.

In addition to the components of the moisture sensing system 200, the system 500 includes a computing device 504. The computing device 504 can be, for example, a smartphone comprising a processor, a memory, and computer-executable instructions stored in the memory and configured so that the computer-executable instructions, when executed by the processor, cause the computing device 504 to perform the logical and computational operations discussed below. Other types of computing devices, such as a PC, a server, a mainframe, a mini computer, a microcomputer, etc., can be used in lieu of a smartphone in alternative embodiments. In other alternative embodiments, the computing device 600 of the moisture sensing system 200 can be configured to perform the functions of the computing device 504, eliminating the need for the computing device 504.

The computing device 504 also can act as a user interface by which the user can enter the below-noted inputs needed to perform the process 500. The computing device 504 also can function as a display to provide the user with the estimated range of drying times, and other information. Alternative embodiments of the system 500 can include an input device and/or a display that are separate from the computing device 504. The computing device 504 can communicate with the moisture sensing system 200 (or other sensor array) using a wired means and a suitable protocol such as Ethernet, Modbus, etc.; or using a suitable wireless means such as BLUETOOTH, WiFi, Zigbee, LTE, etc.

The system 500 can determine a range drying times for the resin granulates, based on the initial moisture content of the resin granulates, a targeted moisture content for the resin granulates, and other factors, as follows.

The user provides inputs to the system 500 by way of the computing device 504, e.g., the smartphone, in response to prompts displayed on the computing device 504 (step 520 of FIG. 14). The user-provided inputs can include, for example: the type and grade of the resin to be dried; the recommended drying air temperature, as provided by the resin manufacturer; the moisture content at which the resin granulates become saturated, as a function of the temperature of the granulates, as provided by the resin manufacturer; a recommended drying time, as provided by the resin manufacturer; the bulk density of the resin granulates (e.g., in pounds per cubic foot); the throughput of the dryer (e.g., in pounds per hour); the volume of the dryer (e.g., in cubic feet); the moisture content required for downstream processing of the resin granulates (e.g., in parts per million); and the type of storage vessel from which the resin granulates will be drawn.

The moisture content of the resin granulates can be calculated based on various parameters measured prior to the start of the drying process (step 522). For example, when the system 500 is being used in conjunction with the components of the moisture sensing system 200, the first moisture sensor 212 can be immersed in the resin granulates within the takeoff device 210, causing a change in the capacitance of the first moisture sensor 212 as discussed above. The measured capacitance of the first moisture sensor 212 can be sent to the computing device 504 by the transmitter 206 of the second module 204, for processing as discussed below.

In addition, the computing device 504 can receive the following measurements from the corresponding sensors as described above in relation to the moisture sensing system 200, prior to the start of the drying process: intergranular humidity and intergranular temperature of the resin granulates from the intergranular temperature and humidity sensor 211; orientation of the first module 202 from the gyroscope 218; force readings from the force sensor 214; and environmental temperature and humidity from the respective temperature sensor 232 and humidity sensor 234 (step 522).

The computing device 504 is configured to calculate the moisture content of the resin granulates based on the measured capacitance of the first moisture sensor 212, as discussed above in relation to the moisture sensing system 200 (step 524). The computing device 504 is further configured to adjust the calculated moisture content to account for compression of the granulate material, based on the measured force exerted on the force sensor 214, and the orientation of the first module 202 as measured by the gyroscope 218, as also discussed above in relation to the moisture sensing system 200.

The computing device 504 can estimate the moisture gain (or loss) that will occur in the resin granulates based on the difference between the ambient humidity and the intergranular humidity; the manufacturer-recommended drying time for the resin granulates (which is an indication of how long the resin granulates will be exposed to the ambient environment after the initial moisture reading is obtained); and the type of storage vessel (for example, resin granulates in an uncovered Gaylord bin will absorb moisture from the ambient environment at a higher rate than resin granulates in an enclosed silo). The computing device 504 can adjust the calculated moisture content of the resin granulates, up to the saturation level of the resin granulates, to account for the moisture that the resin granulates will gain (or lose) prior to being drawn into the dryer, based on empirical data or a calculated rate of moisture gain (or loss) in view of the difference between the ambient humidity and the intergranular humidity, the anticipated exposure time of the resin granulates to the ambient environment, and a factor accounting for the type of storage vessel (step 526).

The computing device 504 next estimates a range of time, including a maximum time, needed to dry the resin granulates to a target moisture content, i.e., the moisture content required for downstream processing of the resin granulates. More specifically, the computing device 504 can calculate the quantity of resin granulates in the dryer, by weight, based on the volume of the dyer and the bulk density of the resin granulates. The computing device 504 determines the total amount of moisture that needs to be removed from the quantity of resin granulates based on the difference between the adjusted moisture content and the target moisture content. The computing device 504, using empirical data, or calculated rates of moisture loss at the manufacturer-recommended drying air temperature, and assuming the resin granulates are being exposed to very dry air, e.g., −40° F. dewpoint air in the dryer, estimates a range of residence times required to produce the decrease in moisture content in the resin granulates needed to reach the target moisture content, with the high end of the range representing the maximum drying time (step 528).

The estimated range of drying times to reach the target moisture content, including the maximum drying time at the high end of the range, can be displayed on the computing device 504 (step 530).

The system 500 thus can provide the dryer operator with a recommended range of drying times, including a maximum drying time, that account for the actual moisture content of the resin granulates at the start of the drying process. Thus, in contrast to using the manufacturer-recommended drying time, which is based on an assumed moisture content that likely is higher or lower that the actual moisture content, the use of the system 500 can help avoid drying the resin granulates for longer than is necessary to achieve the target moisture content, which in turn can result in energy savings and a reduction in the potential for over-drying the resin granulates. In addition, the use of the system 500 can help avoid under-drying of the resin granulates when the initial moisture content of the resin granulates is substantially above the assumed moisture content.

We claim:

1. A system for drying resin granulates, comprising:
   a first humidity sensor communicatively coupled to the computing device and configured to measure an intergranular humidity of the resin granulates;

a resin dryer configured to receive the resin granulates and to subject the resin granulates to heated and/or dehumidified process air within the resin dryer; and
   one or more computing devices communicatively coupled to the first humidity sensor and the resin dryer, wherein the one or more computing devices are configured to:
      calculate the moisture content of the resin granulates prior being subjected to the process air, based at least in part on the output of the first humidity sensor,
      determine a targeted drying time based at least in part on a difference between the calculated moisture content of the resin granulates and a targeted moisture content for the resin granulates, and
      cause the resin granulates to be subjected to the process air for a time period approximately equal to the targeted drying time.

2. The system of claim 1, further comprising a force sensor communicatively coupled to the one or more computing devices and configured to be immersed in the resin granulates, wherein the one or more computing devices are further configured to calculate the moisture content of the resin granulates based at least in part on an output of the force sensor.

3. The system of claim 1, further comprising:
   a moisture sensor configured to generate an output relating to the moisture content of the resin granulates; and
   a gyroscope communicatively coupled to the one or more computing devices and configured to measure an orientation of the moisture sensor, wherein the one or more computing devices are further configured to calculate the moisture content of the resin granulates based at least in part on the orientation of the moisture sensor.

4. The system of claim 1, wherein the one or more computing devices are further configured to display the targeted drying time.

5. The system of claim 1, further comprising:
   a second humidity sensor communicatively coupled to the one or more computing devices and configured to measure the humidity of the environment around the resin granulates;
   wherein:
   the one or more computing devices are further configured to adjust the calculated moisture content of the resin granulates based at least in part on a difference between the intergranular humidity and the environmental humidity, and
   the one or more computing devices are further configured to determine the targeted drying time based at least in part on the difference between the adjusted moisture content of the resin granulates and the targeted moisture content for the resin granulates.

6. The system of claim 5, wherein the one or more computing devices are further configured to adjust the calculated moisture content of the resin granulates based at least in part on the targeted drying time.

7. The system of claim 6, wherein the one or more computing devices are further configured to adjust the calculated moisture content of the resin granulates based at least in part on a conveying distance between the first humidity sensor and a process device to which the resin granulates will be drawn.

8. The system of claim 1, wherein the one or more computing devices include a smartphone.

9. A process for drying resin granulates, comprising:
   inputting at least some of the following information into a computing device:

the type and/or grade of the resin granulates;

a recommended drying air temperature;

a moisture content at which the resin granulates become oversaturated and cannot be dried;

a recommended drying time;

a throughput of a resin dryer;

a volume of the resin dryer;

a target moisture content for the resin granulates; and a type of storage vessel in which the resin granulates are or have been held;

measuring an intergranular humidity of the resin granulates before subjecting the resin granulates to heated and/or dehumidified process air within the resin dryer;

calculating a moisture content in the resin granulates based at least in part on the measured intergranular humidity of the resin granulates;

determining a targeted drying time based at least in part on a difference between the calculated moisture content of the resin granulates and the target moisture content for the resin granulates;

introducing the resin granulates into the resin dryer; and subjecting the resin granulates to the process air for a time period approximately equal to the targeted drying time.

10. The process of claim 9, further comprising: measuring a force exerted on a force sensor immersed in the resin granulates; wherein calculating a moisture content in the resin granulates before subjecting the resin granulates to the process air comprises calculating the moisture content in the resin granulates before subjecting the resin granulates to the process air based at least in part on the measured force.

11. The process of claim 9, further comprising measuring a capacitance of a moisture sensor immersed in the resin granulates; wherein calculating a moisture content in the resin granulates before subjecting the resin granulates to the process air comprises calculating the moisture content in the resin granulates before subjecting the resin granulates to the process air based at least in part on the measured capacitance of the moisture sensor.

12. The process of claim 11, further comprising measuring an orientation of the moisture sensor; wherein calculating a moisture content in the resin granulates before subjecting the resin granulates to the process air comprises calculating the moisture content in the resin granulates before subjecting the resin granulates to the process air based at least in part on the measured orientation of the moisture sensor.

13. The process of claim 9, further comprising:

measuring the environmental humidity around the resin granulates;

determining a difference between the intergranular humidity of the resin granulates and the environmental humidity around the resin granulates;

adjusting the calculated moisture content in the resin granulates based at least in part on the difference between the intergranular humidity of the resin granulates and the environmental humidity around the resin granulates; and determining a drying time based at least in part on a difference between the calculated moisture content of the resin granulates before subjecting the resin granulates to the process air and the target moisture content for the resin granulates includes determining the drying time based at least in part on a difference between the adjusted moisture content of the resin granulates before subjecting the resin granulates to the process air and the target moisture content for the resin granulates.

* * * * *